W. P. Valentine,
Sawing Shingles.
Nº 23,327.  Patented Mar. 22, 1859.
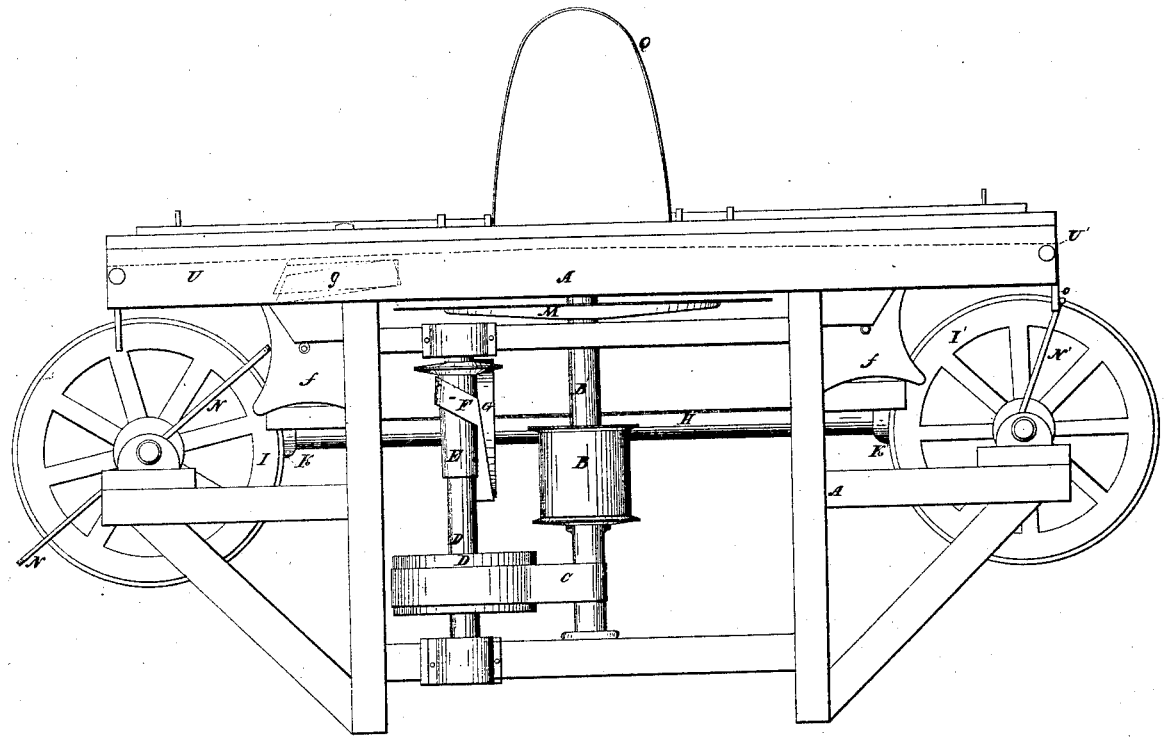
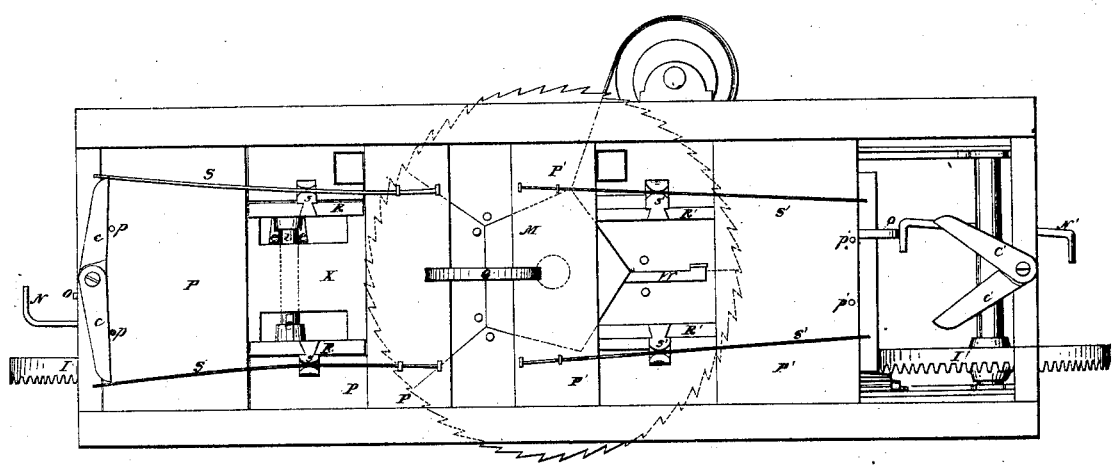
Witnesses:
Daniel Breed
William Beels
Inventor:
Wm. P. Valentine

UNITED STATES PATENT OFFICE.

WILLIAM P. VALENTINE, OF FOND DU LAC, WISCONSIN.

SHINGLE-MACHINE.

Specification forming part of Letters Patent No. 23,327, dated March 22, 1859; Reissued November 14, 1865, No. 2,107.

*To all whom it may concern:*

Be it known that I, WM. P. VALENTINE, of Fond du Lac, in the county of Fond du Lac and State of Wisconsin, have invented a new and useful Improvement in Shingle-Machines; and I do hereby declare that the following is a full and exact description thereof, reference being had to the accompanying drawings and to the letters of reference marked thereon.

In the construction of shingle machines, it has been usual to employ only one carriage, and to saw only in one direction, thus allowing the saw to run free or idly while the carriage is returning to be ready for a second cut. With the common carriage way and saw, it would be impossible to saw in both directions, because the saw would bind against the shingle block for want of sufficient "rake" as it is technically called. In order to employ two carriages successfully I have constructed a machine with a double inclined carriage way, and have also made the saw concave on one side. Upon trial my machine has proved perfectly successful. It has also been found difficult to regulate the rate of feed so as to keep the saw running at a great velocity during the entire cut. Often the rate of feed is regulated by hand so as to saw the greatest amount of lumber in a given time. By the construction of my machine, the feed is rapid at the commencement of the cut, when the saw runs easiest, and becomes slower and slower as the saw advances and the resistance increases. I have also made several other improvements which facilitate the operation of the machine.

In the accompanying drawings, Figure 1 is a side view of my shingle machine. Fig. 2 is a top view of the same.

My invention consists in an improved construction of shingle machine by which the shingles are sawed and planed simultaneously, both operations being performed with great rapidity and with a small amount of power.

The frame of my machine may be of any suitable construction, as seen at A in the accompanying drawings. The band pulley B, is set in motion by any ordinary power, thus giving motion to the shaft B', and to the circular saw M. The shaft B' also communicates motion to pulley D and shaft D' through band C. By means of pulley E and band F motion is transmitted to the horizontal shaft H, which carries bevel gears K K' engaging with wheels I and I', setting the latter in revolution. These wheels I and I' carry two arms, N and N' the extremities of which are bent over, as seen in Fig. 2. At each half revolution of the wheels I and I', the arms N, N' strike the pins O, O', (projecting from the carriages, P P',) and push said carriages forward toward the saw M, thus feeding the saw.

In Fig. 2, the arm N' has pushed the carriage P' completely forward, and the arm N' is about to slip past the pin O', and release the carriage P'. A spring Q is attached to both carriages and drives them back, (as shown at P, Fig. 2,) the moment they are released from the arms O, and O'. The relation of the two arms O, O', is such that one carriage begins to advance immediately after the other is realeased and driven back, so that the saw cuts alternately upon the right hand and upon the left. The pins, O, O', should be of sufficient length to continue the feed through about one-fourth of a revolution of wheels I, I'. The feed arms N, N', advance the carriages P, P', most rapidly when they first strike the pins O, O', just when the speed of the saw is greatest. As the saw advances into the shingle block and the resistance to the saw increases, the rate of feed is proportionately diminished until the carriage is released. In this manner the saw is kept almost constantly cutting and must run at a very uniform speed. The carriages P, P,' run upon ways U, U,' best seen in dotted lines, Fig. 1. These ways rise a little as they approach each other so as to give the saw "rake" and thus prevent it from binding or heating. For the same purpose I also prefer making the saw slightly concave on its upper face.

Upon the upper surface of the saw are attached several small planes, W, for the purpose of smoothing or planing the shingles at the same time that they are sawed. By making the saw concave upon its face, there is more room for the plane and for the bar or shank by which it is fastened, and the shavings also have sufficient room to escape. Moreover the concavity of the saw gives rake to the latter, and may thus allow the carriage with the block to pass completely across the saw, so as to cut the next shingle upon the return of the carriage. Such motion of the carriage, however, is not equal to my arrangement, as the saw will run idly while the block is being adjusted for the next cut and also while a fresh block is being put upon the carriage. In my machine, one block is adjusted while the saw cuts a shingle from the other, and there is ample time to put on a fresh block while the carriage is at rest, awaiting the cutting of a shingle from the other block.

The shingle blocks are held in place by four head blocks R, R'. These head blocks are pressed forward by springs S and S'; with which they are connected by peculiar bearings s, s', so that the head blocks may vibrate to fit the ends of the shingle blocks when the latter are cut obliquely. The springs S and S', are firmly attached at one end to the carriages P, P', while the other end is free. As the carriages P, P', are driven back by the spring Q, the pins p, p' strike the spreaders c, c', and drive the latter back, opening the springs S, S and S', S', so as to release the shingle block from the grasp of the head blocks R, R, and R', R', and allow it to fall for the purpose of cutting the next shingle.

The shingle block sests upon a tilting table X, Fig. 2, which in turn is supported upon pivots, so as to be rocked toward either side of the machine at pleasure. Under the table X, is a roller i, provided with two sets of cams e, for rocking the table alternately to one side and to the other of the machine. This roller i, carries a large cam f, which is caught by a movable stud g, (seen in dotted lines, Fig. 1) when the carriage is driven back, thus turning the roller i, and tilting the table X by means of cams e. In this manner the shingle block is alternately tilted from one side of the machine to the other, and brought in proper position for the saw to operate so as to cut the butt of one shingle from one end of the block, and the butt of the next from the opposite end of the same.

The chief advantages of my invention are:
1. The feed varies so that the saw can be kept moving at a high rate of speed and thus saw a large amount of shingles in a given time. 2. By means of two carriages the saw can be kept constantly at work. 3. The shingles are planed at the same time that they are sawed, and hence are of superior quality.

I do not intend to limit myself to the especial mechanical devices employed in my machines, as these may be somewhat varied, and yet accomplish the same result.

I am aware that small chisels have been placed upon the convex side of a thick saw flange, for the purpose of cutting away splinters to prevent the latter from catching behind the spreader. I am also aware that shingle machines have been fed by hand at a varying rate of speed.

Having thus fully described my invention, what I claim and desire to secure by Letters Patent of the United States is:

1. Varying the rate of feed by the mechanical means set forth, so as to feed the lumber to the saw more rapidly during the first half of a cut, when the saw has the highest velocity, and slower during the latter half of a cut, in order to keep the saw constantly at a uniform velocity.

2. I claim the use of the two carriages, P and P', operating in the particular manner described, for the purpose of cutting alternately on both sides of the saw, thus keeping the saw constantly at work, and preventing the loss of time or power while the lumber is returning with the carriage, to be ready for the next cut.

3. I do not claim the concave-convex saw or the planes upon its surface as separate mechanical devices, but I claim the concave saw, and the planes, in combination with the saw carriage, for giving rake to the saw, and for sawing and planing shingles at a single operation, substantially as described.

4. I claim the arrangement of springs S, S, and S', S', the head blocks R, R, and R' R' and the spreaders c, c, and c', c', for alternately holding and dropping the shingle block, substantially as set forth.

WM. P. VALENTINE.

Witnesses:
 EDM. F. BROWN,
 DANIEL BREED.

[FIRST PRINTED 1911.]